(12) United States Patent
Huh (10) Patent No.: US 12,403,888 B2
(45) Date of Patent: Sep. 2, 2025

(54) DRIVING CONTROL METHOD OF HYBRID VEHICLE, AND VEHICLE SYSTEM PERFORMING THE SAME

(71) Applicants: Hyundai Motor Company, Seoul (KR); Kia Corporation, Seoul (KR)

(72) Inventor: Jeewook Huh, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 492 days.

(21) Appl. No.: 17/744,969

(22) Filed: May 16, 2022

(65) Prior Publication Data

US 2022/0402477 A1     Dec. 22, 2022

(30) Foreign Application Priority Data

Jun. 21, 2021  (KR) .......................... 10-2021-0079812

(51) Int. Cl.
*B60W 20/12*    (2016.01)
*B60L 58/14*    (2019.01)
(Continued)

(52) U.S. Cl.
CPC .............. *B60W 20/12* (2016.01); *B60L 58/14* (2019.02); *B60W 10/26* (2013.01);
(Continued)

(58) Field of Classification Search
CPC .... B60W 20/12; B60W 10/26; B60W 40/105; B60W 40/12; B60W 50/14; B60W 2050/146; B60W 2710/244; B60W 2552/20; B60W 2556/50; B60W 20/13; B60W 20/16; B60W 20/40; B60W 30/188; B60W 40/00; B60W 2552/00; B60W 2555/60; B60W 2710/08;
(Continued)

(56) References Cited

U.S. PATENT DOCUMENTS

| 2019/0126907 A1* | 5/2019 | Park ...................... B60W 20/16 |
| 2019/0390970 A1* | 12/2019 | Cha ........................ B60W 20/00 |
| 2020/0180599 A1* | 6/2020 | Kang ....................... B60K 6/22 |

FOREIGN PATENT DOCUMENTS

| CN | 105786895 B | * | 3/2020 | |
| JP | 3203976 B2 | * | 9/2001 | ............. B60K 31/00 |
| KR | 20200016560 A | * | 2/2020 | |

* cited by examiner

*Primary Examiner* — Anne Marie Antonucci
*Assistant Examiner* — Jewel Ashley Kuntz
(74) *Attorney, Agent, or Firm* — Morgan Lewis & Bockius LLP (57) ABSTRACT

A vehicle system of a hybrid vehicle includes: a navigation device that searches a movement path to a destination of a vehicle; and a vehicle control device configured to predict driving energy of a road section included in the movement path according to a vehicle speed of the vehicle when the movement path includes an exhaust gas emission restriction zone, predict first consumption State of charge (SOC) value of the battery consumed within the exhaust gas emission restriction zone based on the driving energy for a case in which the vehicle drives in the exhaust gas emission restriction zone without driving the engine, determine a target SOC value of the battery at a time when the vehicle enters the exhaust gas emission restriction zone based on the predicted first consumption SOC, and control the operation of the vehicle.

16 Claims, 3 Drawing Sheets

(51) Int. Cl.
  *B60W 10/26* (2006.01)
  *B60W 40/105* (2012.01)
  *B60W 40/12* (2012.01)
  *B60W 50/14* (2020.01)

(52) U.S. Cl.
  CPC .......... *B60W 40/105* (2013.01); *B60W 40/12* (2013.01); *B60W 50/14* (2013.01); *B60W 2050/146* (2013.01); *B60W 2710/244* (2013.01)

(58) Field of Classification Search
  CPC ........... B60W 2710/242; B60W 10/06; B60W 40/076; B60W 40/1005; B60W 2050/143; B60W 2520/10; B60W 2530/10; B60W 2530/16; B60W 2552/15; B60L 58/14; B60L 50/16; B60L 2240/12; B60L 2240/622; B60L 2240/642; B60L 2250/10; B60L 2260/54; B60L 2270/12; B60L 58/13; B60L 58/12; B60L 2240/54; B60L 2240/60; B60L 2240/62; B60K 35/00; B60K 35/22; B60Y 2200/91; B60Y 2200/92; Y02T 10/70; Y02T 10/7072

See application file for complete search history.

DRIVING CONTROL METHOD OF HYBRID VEHICLE, AND VEHICLE SYSTEM PERFORMING THE SAME

CROSS-REFERENCE TO RELATED APPLICATION

The present application claims priority to Korean Patent Application No. 10-2021-0079812 filed on Jun. 21, 2021, the entire contents of which is incorporated herein for all purposes by this reference.

BACKGROUND OF THE PRESENT DISCLOSURE

Field of the Present Disclosure

The present disclosure relates to a driving control method of a hybrid vehicle and a vehicle system performing the same.

Description of Related Art

As interest in global warming increases, various environmental regulation measures for vehicles are being implemented. One of these environmental regulation measures, a zero-emission zone (ZEZ), is a policy for restricting driving of vehicles that emit exhaust gas for a specific area. A vehicle without emission of exhaust gas, that is, an electric vehicle, may be operated free of charge within the ZEZ. However, a vehicle that exhausts exhaust gas may pay a predetermined amount to operate within the ZEZ.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a driving control method of a hybrid vehicle and a vehicle system performing the same for efficiently managing an SOC value of a vehicle entering an area where emission of exhaust gas is restricted, such as a zero emission zone (ZEZ).

A vehicle system of a hybrid vehicle according to an exemplary embodiment of the present disclosure includes: a navigation device configured to search a movement path to a destination of a vehicle; and a vehicle control device. The vehicle control device is configured to: predict driving energy of a road section included in the movement path according to a vehicle speed of the vehicle when the movement path includes an exhaust gas emission restriction zone; predict a first consumption State of charge (SOC) value of a battery consumed within the exhaust gas emission restriction zone based on the driving energy for a case in which the vehicle drives in the exhaust gas emission restriction zone without driving an engine of the vehicle; determine a target SOC value of the battery when the vehicle enters the exhaust gas emission restriction zone based on the predicted first consumption SOC; and control operation of the vehicle so that a residual SOC value of the battery is greater than or equal to the target SOC value when the vehicle enters the exhaust gas emission restriction zone.

The vehicle control device may be configured to: predict an expected vehicle speed of the vehicle for the road section included in the exhaust gas emission restriction zone based on the vehicle speed of the vehicle during a predetermined time period, a first road average vehicle speed in a road section that the vehicle has passed during the predetermined time period and a second road average vehicle speed in the road section included in the exhaust gas emission restriction zone; and predict the driving energy for the road section included in the exhaust gas emission restriction zone based on the expected vehicle speed.

The vehicle control device may be configured to predict the expected vehicle speed from the second road average vehicle speed in the road section included in the exhaust gas emission restriction zone based on a difference between the vehicle speed in the road section over which the vehicle passed and the first road average vehicle speed, or a ratio of the vehicle speed for the first road average vehicle speed in the road section over which the vehicle passed.

The vehicle control device may be configured to predict the driving energy based on the expected vehicle speed in the corresponding road section, and an air resistance force of the vehicle corresponding to a front projection area of the vehicle, an inclination angle of the corresponding road section, and a rolling resistance force and climbing force of the vehicle corresponding to a weight of the vehicle.

The vehicle control device may be configured to predict an SOC value consumed by the vehicle to pass the exhaust gas emission restriction zone as the first consumption SOC value when the movement path passes through the exhaust gas emission restriction zone.

The vehicle control device, when the destination is positioned within the exhaust gas emission restriction zone, may be configured to determine the first consumption SOC value by use of a second consumption SOC value consumed by the vehicle to the destination by entering the exhaust gas emission restriction zone, and a third consumption SOC value consumed by the vehicle moving from the destination to an electric vehicle charging station within the exhaust gas emission restriction zone or from the destination to leaving the exhaust gas emission restriction zone.

The vehicle control device may be configured to: after the vehicle enters the exhaust gas emission restriction zone, determine an available SOC value of the battery based on a fourth consumption SOC value consumed by the vehicle moving from a current position thereof to the electric vehicle charging station positioned within the exhaust gas emission restriction zone or moving from the current position to leaving the exhaust gas emission restriction zone, and the residual SOC value of the battery; and induce the movement of the vehicle so that the engine is not driven within the exhaust gas emission restriction zone when the available SOC is lowered below a predetermined level.

The vehicle system may further include a display device,

The vehicle control device may be configured to display the available SOC through the display device.

The vehicle control device may be configured to output a warning signal through the display device when the available SOC is lower than a first reference SOC.

If the available SOC is lower than the first reference SOC, the vehicle control device may be configured to provide a movement path for the vehicle to move from the current position to the electric vehicle charging station positioned within the exhaust gas emission restriction zone through the navigation device or to exit the exhaust gas emission restriction zone from the current position.

The vehicle control device, when the available SOC is lower than a predetermined value, may be configured to change a second reference SOC, which is a reference for turning on the engine to prevent an overdischarge of the battery.

The exhaust gas emission restriction zone may be a zero emission zone (ZEZ).

A method of controlling driving of a hybrid vehicle according to an exemplary embodiment of the present disclosure includes: predicting a driving energy of a road section included in a movement path according to a vehicle speed of the vehicle when a movement path to a destination of the vehicle searched by a navigation device includes an exhaust gas emission restriction zone; predicting a first consumption State of charge (SOC) value of the battery consumed within the exhaust gas emission restriction zone based on the predicted driving energy for a case in which the vehicle drives in the exhaust gas emission restriction zone without driving an engine of the vehicle; determining a target SOC value of the battery at a time the vehicle enters the exhaust gas emission restriction zone based on the predicted first consumption SOC; and controlling an operation of the vehicle so that a residual SOC value of the battery is greater than or equal to the target SOC value when the vehicle enters the exhaust gas emission restriction zone.

The driving control method may further include controlling an operation of the vehicle so that a residual SOC value of the battery is greater than or equal to the target SOC value when the vehicle enters the exhaust gas emission restriction zone.

The predicting of the driving energy may include: predicting the expected vehicle speed of the vehicle for the road section included within the exhaust gas emission restriction zone based on the vehicle speed of the vehicle during a predetermined time period, a first road average vehicle speed in a road section that the vehicle has passed during the predetermined time period, and a second road average vehicle speed in the road section included in the exhaust gas emission restriction zone; and predicting the driving energy for the road section included in the exhaust gas emission restriction zone based on the expected vehicle speed.

The predicting of the expected vehicle speed may include predicting the expected vehicle speed from the second road average vehicle speed in the road section included in the exhaust gas emission restriction zone based on a difference between the vehicle speed in the road section over which the vehicle passed and the first road average vehicle speed, or a ratio of the vehicle speed for the first road average vehicle speed in the road section over which the vehicle passed.

The predicting of the driving energy based on the vehicle speed may include predicting the driving energy based on the expected vehicle speed in the corresponding road section, and an air resistance force of the vehicle corresponding to a front projection area of the vehicle, an inclination angle of the corresponding road section, and a rolling resistance force and climbing force of the vehicle corresponding to a weight of the vehicle.

The predicting of the first consumption SOC value may include predicting an SOC value consumed by the vehicle to pass the exhaust gas emission restriction zone as the first consumption SOC value when the movement path passes through the exhaust gas emission restriction zone.

The predicting of the first consumption SOC value may include determining the first consumption SOC value by use of a second consumption SOC value consumed by the vehicle to the destination by entering the exhaust gas emission restriction zone, and a third consumption SOC value consumed by the vehicle moving from the destination to the electric vehicle charging station within the exhaust gas emission restriction zone or from the destination to leaving the exhaust gas emission restriction zone when the destination is positioned within the exhaust gas emission restriction zone.

The driving control method may further include: determining an available SOC value of the battery based on a fourth consumption SOC value consumed by the vehicle moving from a current position thereof to an electric vehicle charging station positioned within the exhaust gas emission restriction zone or moving from the current position to leaving the exhaust gas emission restriction zone, and the residual SOC value of the battery after the vehicle enters the exhaust gas emission restriction zone; and inducing the movement of the vehicle so that the engine is not driven within the exhaust gas emission restriction zone when the available SOC is lowered below a predetermined level.

The driving control method may further include displaying the available SOC through a display device.

The inducing may include outputting a warning signal through the display device when the available SOC is lower than a first reference SOC.

The inducing may include providing a movement path for the vehicle to move from the current position to the electric vehicle charging station positioned within the exhaust gas emission restriction zone through the navigation device or to exit the exhaust gas emission restriction zone from the current position when the available SOC is lower than the first reference SOC.

The driving control method may further include changing a second reference SOC, which is a reference for turning on the engine to prevent an overdischarge of the battery when the available SOC is lower than a predetermined value.

According to various exemplary embodiments of the present disclosure, by efficiently controlling the SOC value of the vehicle entering an area where exhaust gas emission is restricted, it is possible to improve driver satisfaction.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present disclosure will be described in detail with reference to the accompanying drawings. In an exemplary embodiment of the present disclosure, the same or similar components will be denoted by the same or similar reference numerals, and an overlapped description thereof will be omitted.

The terms "module" and "unit" for components used in the following description are used only to easily make a specification. Therefore, these terms do not have meanings or roles that distinguish them from each other in themselves. Furthermore, in describing embodiments of the exemplary embodiment, when a detailed description of the well-known art associated with the present disclosure may obscure the gist of the present disclosure, it will be omitted. Furthermore, the accompanying drawings are provided only to allow embodiments included in an exemplary embodiment of the present disclosure to be easily understood and are not to be interpreted as limiting the spirit included in an exemplary embodiment of the present disclosure, and it is to be understood that the present disclosure includes all modifications, equivalents, and substitutions without departing from the scope and spirit of the present disclosure.

Terms including ordinal numbers such as first, second, and the like will be used only to describe various components, and are not interpreted as limiting these components. The terms are only used to differentiate one component from other components.

It is to be understood that when one component is referred to as being "connected" or "coupled" to another component, it may be directly connected or coupled to another component or be connected or coupled to another component with the other component intervening therebetween. On the other hand, it is to be understood that when one component is referred to as being "connected or coupled directly" to another component, it may be connected to or coupled to another component without another component intervening therebetween.

It will be further understood that terms "comprise" or "have" used in an exemplary embodiment of the present disclosure specify the presence of stated features, numerals, steps, operations, components, or a combination thereof, but do not preclude the presence or addition of one or more other features, numerals, steps, operations, components, parts, or a combination thereof.

Furthermore, the terms "-er", "-or", and "module" described in the specification mean units for processing at least one function and operation and may be implemented by hardware components or software components and combinations thereof.

Below, an area where emission of exhaust gas is restricted such as a zero emission zone (ZEZ) is named and used as "an exhaust gas emission restriction zone".

Figure 1:
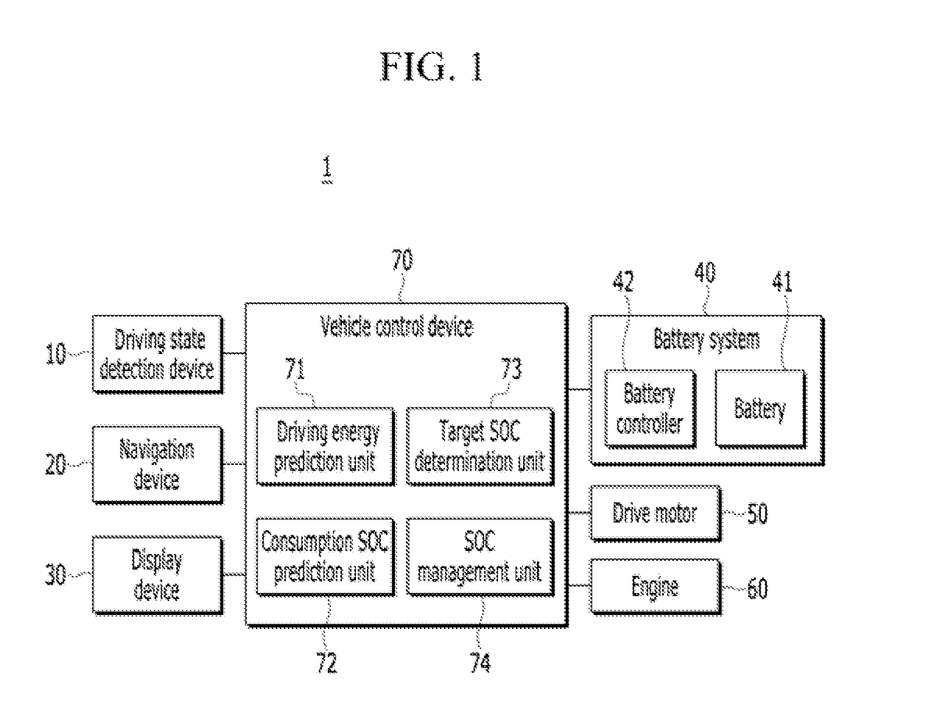
FIG. 1 is a schematic view showing a vehicle system according to an exemplary embodiment of the present disclosure.

FIG. 1 is a schematic view showing a vehicle system according to an exemplary embodiment of the present disclosure.

A vehicle system 1 of FIG. 1 may be mounted to a drive motor 50 driven by receiving electrical energy from a battery 41 and a hybrid vehicle (e.g., a plug-in hybrid vehicle (PHEV)) that utilizes the battery 41 and an engine 60 as power sources.

Referring to FIG. 1, a vehicle system 1 may include a driving state detection device 10, a navigation device 20, a battery system 40, a display device 30, and a vehicle control device 70.

The driving state detection device 10 may include at least one detector to be provided in the vehicle, and it is possible to detect the driving state information of the vehicle through them. For example, the vehicle state detection device 10 may detect the driving speed of the vehicle (hereinafter, referred to as "a vehicle speed") through the vehicle speed detector.

The navigation device 20 may detect current position information of the vehicle through a global positioning system (GPS) detector or the like. The navigation device 20 may search for a movement path from the current position of the vehicle to the destination based on the destination information input by the vehicle user.

The navigation device 20 may store a map data used for the path search in an internal memory for the path search. In the map data used for the path search, each road includes at least one road section (or a link), and the map data may include road information for each road section. Furthermore, the road information may include a road type (a free road, a highway, etc.) of the corresponding road section, road properties (a tollgate, an intersection, etc.), a speed limit, slope information, and the like. The map data may further include information related to the exhaust gas emission restriction zone. That is, the map data may include the information on the road sections included in the exhaust gas emission restriction zone. For example, the road attributes of the road sections included in the exhaust gas emission restriction zone may include an attribute value indicating that the corresponding road section is included in the exhaust gas emission restriction zone. The map data may further include point of interest (POI) information including position information of major restaurants, gas stations, electric vehicle charging stations, and the like.

The navigation device 20 may receive traffic information from a traffic information providing server connected to wireless communication for the path discovery. Here, the traffic information may include a congestion degree and an average vehicle speed (hereinafter, referred to as "a road average vehicle speed") of each road section.

The navigation device 20 may search a movement path to a destination by use of the above-described map data and traffic information. Accordingly, the navigation device 20 may display path guide information for the searched movement path through the display device 30. When the vehicle enters and exits the exhaust gas emission restriction zone, the navigation device 20 may display the guide information related to entering and exiting the exhaust gas emission restriction zone through the display device 30.

The battery system 40 may include a battery 41 that provides electrical energy to the drive motor 50 of the vehicle, and a battery controller (e.g., a battery management system (BMS)) 42 for managing the battery 41. The battery controller 42 may control charging and discharging of the battery 41, cell balancing, etc. The battery controller 42 may determine information on a state of charge (SOC) value of the battery 41 based on the battery state information (a voltage, a current, a temperature, etc.) detected from the battery 41.

The display device 30 may display various information and data processed in the vehicle system 1. For example, the display device 30 may display the path guide information for the movement path searched through the navigation device 20. For example, the display device 30 may display the remaining SOC value of the battery 41. Furthermore, for example, the display device 30 may display information guiding the entry and exit to the exhaust gas emission restriction zone. Furthermore, for example, when the residual SOC value of the battery 41 is low, the display device 30 may display guiding information to leave the exhaust gas emission restriction zone or move to an electric vehicle charging station. As the display device 30, Audio, Video, and Navigation (AVN) of the vehicle, a cluster, an HUD (Head Up Display), etc. may be used.

The vehicle control device 70 may receive information related to the vehicle's current position, the movement path, the entry into the exhaust gas emission restriction zone, etc. from the navigation device 20 through intra-vehicle communication, such as Controller Area Network (CAN) communication, and information on the road information of the road where the vehicle has driven or the road is predicted to be driven, the traffic information, the position information of the electric vehicle charging stations, etc. The vehicle control device 70 may receive information on the driving state of the vehicle from the driving state detection device 10 through the intra-vehicle communication such as the CAN communication.

The vehicle control device 70 may identify the entry and exit of the exhaust gas emission restriction zone of the vehicle based on the vehicle's current position information. When the vehicle enters the exhaust gas emission restriction zone, the vehicle control device 70 may stop the engine 60 of the vehicle and control the driving of the vehicle so that the power is supplied to the vehicle with only the drive motor 50.

The vehicle control device 70 may predict in advance whether the vehicle may enter the exhaust gas emission restriction zone based on the movement path information of the vehicle received from the navigation device 20.

The vehicle control device 70 may predict the SOC value of the battery 41 consumed by the vehicle within the exhaust gas emission restriction zone when the entry into the exhaust gas emission restriction zone of the vehicle is predicted. The vehicle control device 70 may determine the target SOC value when the vehicle enters the exhaust gas emission restriction zone based on the determined SOC when the SOC predicted to be consumed by the vehicle within the exhaust gas emission restriction zone is determined. The vehicle control device 70 may also control the drive motor 50 and the engine 60 to satisfy the target SOC value when the vehicle enters the exhaust gas emission restriction zone based on the determined target SOC.

When the vehicle enters the exhaust gas emission restriction zone, the vehicle control device 70 may predict the SOC which may be used by the vehicle within the exhaust gas emission restriction zone (hereinafter, referred to as "an available SOC") based on the actual SOC value of the battery 41. The vehicle control device 70 may also induce the vehicle to exit the exhaust gas emission restriction zone or move to the electric vehicle charging station within the exhaust gas emission restriction zone based on the predicted available SOC.

Hereinafter, the operation of the vehicle control device 70 is described in more detail.

The vehicle control device 70 may include a driving energy prediction unit 71, a consumption SOC value prediction unit 72, a target SOC value determination unit 73, and an SOC management unit 74.

The driving energy prediction unit 71 may predict in advance the driving energy required for the vehicle to drive each road section included in the movement path. To the present end, the driving energy prediction unit 71 may identify the road sections in which the vehicle has already traveled and the road sections in which the vehicle is predicted to travel based on the movement path information received from the navigation device 20. The driving energy prediction unit 71 may also obtain the road information (e.g., gradient information, etc.) and the traffic information (e.g., a road average vehicle speed) from the navigation device 20 for the identified road sections. Furthermore, the driving energy prediction unit 71 may analyze the driving pattern of the driver based on the driving state information received from the driving state detection device 10 for a predetermined time period. Here, the driving pattern may be obtained by comparing the road average vehicle speed of the road sections that the vehicle has passed for a predetermined time period with the vehicle speed of the vehicle while passing the corresponding section.

The driving energy prediction unit 71 may determine an expected vehicle speed of the vehicle in each road section where the vehicle is predicted to travel based on the driving pattern of the driver analyzed for a predetermined time period. Equations 1 and 2 below show examples of determining the expected vehicle speed ($V_{F\_CAR}$) in each road section.

$$V_{F\_CAR} = V_{F\_LOAD} + (V_{P\_CAR} - V_{P\_LOAD}) \quad \text{[Equation 1]}$$

Referring to Equation 1, the driving energy prediction unit 71 may determine a difference value ($V_{P\_CAR} - V_{P\_LOAD}$) between the road average vehicle speed ($V_{P\_LOAD}$) of at least one road section that the vehicle has passed and the average vehicle speed ($V_{P\_CAR}$) of the vehicle with which the vehicle passes the corresponding road section. Accordingly, the driving energy prediction unit 71 may determine the expected vehicle speed ($V_{F\_CAR}$) of the vehicle in the corresponding road section.

By adding the determined difference value ($V_{P\_CAR} - V_{P\_LOAD}$) to the road average vehicle speed ($V_{F\_LOAD}$) of each road section where the vehicle is expected to travel, the estimated driving speed of the vehicle in the corresponding road section ($VF_{\_CAR}$) may be determined. The road average vehicle speed ($V_{P\_LOAD}$, $V_{F\_LOAD}$) of each road section may be obtained from the traffic information transmitted from the navigation device 20.

For example, when the road average vehicle speed ($V_{P\_LOAD}$) of at least one road section that the vehicle has already passed is 80 kph, and the average vehicle speed ($V_{P\_CAR}$) of the vehicle while passing through the corresponding road sections is 70 kph, the difference value between the two values is 10 kph. In the instant case, when the road average vehicle speed ($V_{F\_LOAD}$) of the road section in which the vehicle is expected to travel is 100 kph, the expected vehicle speed ($V_{F\_CAR}$) of the vehicle for the corresponding road section becomes (100−10)=90 kph.

$$V_{F\_CAR} = V_{F\_LOAD} \times (V_{P\_CAR}/V_{P\_LOAD}) \quad \text{[Equation 2]}$$

Referring to Equation 2 above, the driving energy prediction unit 71 may determine the speed ratio ($V_{P\_CAR}/V_{P\_LOAD}$) of the average vehicle speed ($V_{P\_CAR}$) of the vehicle while passing the corresponding road section with respect to the road average vehicle speed ($V_{P\_LOAD}$) of at least one road section the vehicle has already passed. Accordingly, the driving energy prediction unit 71 may determine the expected vehicle speed ($V_{F\_CAR}$) of the vehicle in the corresponding road section by multiplying the determined speed ratio ($V_{P\_CAR}/V_{P\_LOAD}$) by the road average vehicle speed ($V_{F\_LOAD}$) of each road section where the vehicle is expected to travel.

For example, if the road average vehicle speed ($V_{P\_LOAD}$) of at least one road section that the vehicle has already passed is 80 kph, and the average vehicle speed ($V_{P\_CAR}$) of the vehicle in the corresponding road section is 70 kph, their speed ratio is 87.5%. In the instant case, if the road average vehicle speed ($V_{F\_LOAD}$) of the road section in which the vehicle is expected to travel is 100 kph, the expected vehicle speed ($V_{F\_CAR}$) of the vehicle in the corresponding road section may be 100×0.875=87.5 kph.

The driving energy prediction unit 71 may determine the expected vehicle speed of the vehicle in each road section by use of one of the methods described above (the method (Equation 1) using the speed difference value, the method (Equation 2) using the speed ratio).

The driving energy prediction unit 71 may use the method with a lower error rate for a predetermined time period among the above methods (the method (Equation 1) using the speed difference value, the method (Equation 2) using the speed ratio) to determine the expected vehicle speed of the vehicle. In the instant case, the driving energy prediction unit 71 may determine in advance the expected vehicle speed ($V_{F\_CAR}$) of the vehicle in each road section where the vehicle is predicted to travel by use of both methods. Thereafter, the driving energy prediction unit 71 may determine the error rate of each method by comparing the expected vehicle speed ($V_{F\_CAR}$) determined in advance with the actual vehicle speed while the vehicle is driving the corresponding road section. Furthermore, the driving energy prediction unit 71 may finally determine the expected vehicle speed determined by the method showing the lower error rate as the expected vehicle speed of the vehicle after monitoring the error rate of each method for a predetermined time period.

When the expected vehicle speed of the vehicle in each road section where the vehicle is predicted to travel is determined, the driving energy prediction unit 71 may predict the driving power of the vehicle required in each road section by use of this. The driving energy prediction unit 71 may predict the driving power of the vehicle required in each road section based on the expected vehicle speed of the vehicle in each road section, the slope information of each road section, and the specification information of the vehicle.

Equation 3 below shows an example of a method for determining the driving power Fd of the vehicle.

$Fd$=air resistance force+rolling resistance force+climbing force $0.5\rho CdAv^2$ $\mu mg \cos \theta$ [Equation 3]

In Equation 3 above, the climbing force is the resistance force that the vehicle's wheel experiences when the vehicle climbs the inclined road, and may be expressed by mg sin θ. Here, m is the weight of the vehicle, g is the acceleration of gravity, and θ is the inclination angle of the road.

As described above, when the driving power of the vehicle in each road section is determined, the driving energy prediction unit 71 may predict the driving energy consumed by the vehicle while moving in a predetermined section based on this. For the present purpose, based on the expected vehicle speed of the vehicle in the road section for which the driving energy is to be predicted, the driving energy prediction unit 71 may predict the time required for the vehicle to travel the corresponding road section (hereinafter, referred to as "an expected driving time"). Accordingly, the driving energy prediction unit 71 may determine the driving energy for the corresponding section by accumulating the driving power of the vehicle based on the expected driving time for the section for which the driving energy is to be predicted.

The driving energy prediction unit 71 may predict the driving energy consumed before the vehicle enters the exhaust gas emission restriction zone from the current position.

The driving energy prediction unit 71 may predict the driving energy consumed while the vehicle passes through the exhaust gas emission restriction zone when the movement path of the vehicle is predetermined to pass through the exhaust gas emission restriction zone.

If the vehicle deviates from the movement path searched by the navigation device 20 within the exhaust gas emission restriction zone while passing through the exhaust gas emission restriction zone, the driving energy prediction unit 71 may predict the driving energy consumed to move out of the exhaust gas emission restriction zone from the current position of the vehicle, or to move to the electric vehicle charging station within the exhaust gas emission restriction zone. Even if the vehicle stays within the exhaust gas emission restriction zone, the driving energy prediction unit 71 may also predict the driving energy consumed to move out of the exhaust gas emission restriction zone from the current position of the vehicle, or to move to the electric vehicle charging station within the exhaust gas emission restriction zone. The movement path information for the vehicle to leave the exhaust gas emission restriction zone, or the movement path information for the vehicle to move to the electric vehicle charging station within the exhaust gas emission restriction zone, may be received from the navigation device 20.

When the destination of the vehicle is positioned within the exhaust gas emission restriction zone, the driving energy prediction unit 71 may predict the driving energy until the vehicle enters the exhaust gas emission restriction zone and moves to the destination.

When the destination of the vehicle is located within the exhaust gas emission restriction zone and the electric vehicle charging station is located within the corresponding exhaust gas emission restriction zone, the driving energy prediction unit 71 may predict the driving energy consumed to travel from the destination of the vehicle to the electric vehicle charging station.

When the destination of the vehicle is located within the exhaust gas emission restriction zone and there is no electric vehicle charging station within the exhaust gas emission restriction zone, the driving energy prediction unit 71 may predict the driving energy consumed to move out of the exhaust gas emission restriction zone at the destination of the vehicle. When the vehicle has a plurality of movement paths which may be selected to escape from the exhaust gas emission restriction zone at the destination within the exhaust gas emission restriction zone, the driving energy prediction unit 71 may predict the driving energy for each path, respectively.

Based on the driving energy determined by the driving energy prediction unit 71, the consumption SOC value prediction unit 72 may predict the SOC value of the battery 41 consumed when the vehicle is driven only with the drive motor 50 without driving the engine 60 for a predetermined period. Equation 4 below shows a method for predicting consumption ($SOC_i$) of the battery 41 for a predetermined period.

$$SOC_c = E_i / E_{Full} \quad \text{[Equation 4]}$$

In Equation 4 above, $SOC_c$ represents the SOC value of the battery 41 consumed during a predetermined section, $E_i$ represents the driving energy of the vehicle predicted for the section, and $E_{Full}$ represents the energy when the battery 41 is fully charged.

When the movement path of the vehicle passes through the exhaust gas emission restriction zone, the consumption SOC value prediction unit 72 may predict the consumption SOC value consumed by the vehicle to pass through the exhaust gas emission restriction zone.

If the vehicle deviates from the movement path searched by the navigation device 20 while passing through the exhaust gas emission restriction zone, the consumption SOC value prediction unit 72 may predict the consumption SOC value consumed by moving out of the exhaust gas emission restriction zone from the current position of the vehicle or moving to an electric vehicle charging station within the exhaust gas emission restriction zone.

Even if the vehicle stays within the exhaust gas emission restriction zone, the consumption SOC value prediction unit 72 may predict the consumption SOC value consumed in moving out of the exhaust gas emission restriction zone from the current position of the vehicle or moving to the electric vehicle charging station in the exhaust gas emission restriction zone. If the movement path that the vehicle may select to leave the exhaust gas emission restriction zone is a plurality, the consumption SOC value prediction unit 72 may predict the consumption SOC value of each movement path by substituting the predicted driving energy of each movement path into Equation 4 above.

If the movement path of the vehicle is positioned within the exhaust gas emission restriction zone, the consumption SOC value prediction unit 72 may predict the consumption SOC value consumed when the vehicle enters the exhaust gas emission restriction zone and moves to the destination.

When the destination of the vehicle is located within the exhaust gas emission restriction zone and the electric vehicle charging station is located within the corresponding exhaust gas emission restriction zone, the consumption SOC value prediction unit 72 may predict the consumption SOC value consumed to travel from the destination of the vehicle to the electric vehicle charging station.

If the destination of the vehicle is located within the exhaust gas emission restriction zone and there is no electric vehicle charging station within the exhaust gas emission restriction zone, the consumption SOC value prediction unit 72 may predict the consumption SOC value of the battery 41 consumed to move out of the exhaust gas emission restriction zone at the destination by being driven only by the vehicle's drive motor 50. When the vehicle has a plurality of movement paths which may be selected for leaving the exhaust gas emission restriction zone at the destination within the exhaust gas emission restriction zone, the consumption SOC value prediction unit 72 may predict the consumption SOC value of each movement path by substituting the predicted driving energy of each movement path into Equation 4 above.

The target SOC value determination unit 73 may determine the target SOC value of the vehicle when entering the exhaust gas emission restriction zone based on the consumption SOC value determined by the consumption SOC value prediction unit 72.

Equation 5 below shows a method for determining the target SOC value ($SOC_T$) of the vehicle when entering the exhaust gas emission restriction zone when the movement path of the vehicle passes through the exhaust gas emission restriction zone.

$$SOC_T = SOC_{c1} + SOC_{Ref} \quad \text{[Equation 5]}$$

In Equation 5 above, $SOC_T$ represents the target SOC value of the vehicle when entering the exhaust gas emission restriction zone, $SOC_{c1}$ represents the consumption SOC value of the battery 41 consumed to pass through the exhaust gas emission restriction zone, and $SOC_{Ref}$ indicates a reference SOC which is a reference for turning on the engine 60, that is, operating the engine 60. That is, if the residual SOC value of the battery 41 is too low to prevent a malfunction due to an overdischarge of the battery 41, the $SOC_{Ref}$ is the SOC which is a reference for turning on the engine 60 so that the vehicle is driven by the engine 60.

Equation 6 below, when the destination of the vehicle is located within the exhaust gas emission restriction zone and the electric vehicle charging station is located within the emission restriction zone, shows a method for determining the target SOC value ($SOC_T$) of the vehicle when entering the exhaust gas emission restriction zone.

$$SOC_T = SOC_{c2} + SOC_{Ref} \quad \text{[Equation 6]}$$

In Equation 6 above, $SOC_{c2}$ represents the consumption SOC value of the battery 41 consumed when the vehicle enters the exhaust gas emission restriction zone and moves to the electric vehicle charging station in the exhaust gas emission restriction zone. The consumption SOC value ($SOC_{c2}$) of the battery 41 consumed when the vehicle moves to the electric vehicle charging station in the exhaust gas emission restriction zone, for example, may be the sum value of the consumption SOC value consumed by the vehicle to move to the destination after entering the exhaust gas emission restriction zone and the consumption SOC value consumed by the vehicle to move from the destination to the electric vehicle charging station.

Equation 7 below indicates a method of determining the target SOC value ($SOC_T$) of the vehicle when entering the exhaust gas emission restriction zone when the vehicle's destination is located within the exhaust gas emission restriction zone and there is no electric vehicle charging station within the exhaust gas emission restriction zone.

$$SOC_T = SOC_{c3} + SOC_{Ref} \quad \text{[Equation 7]}$$

In Equation 7 above, $SOC_{c3}$ represents the consumption SOC value consumed by the vehicle from entering the exhaust gas emission restriction zone to leaving the exhaust gas emission restriction zone. $SOC_{c3}$ corresponds to the sum value of the consumption SOC value of the battery 41 consumed to move to the destination after the vehicle enters the exhaust gas emission restriction zone and the consumption SOC value of the battery 41 consumed to move out of the exhaust gas emission restriction zone at the destination.

When the vehicle has a plurality of movement paths which may be selected for leaving the exhaust gas emission restriction zone at the destination within the exhaust gas emission restriction zone, the target SOC value determination unit 73 may determine a minimum target SOC value and a maximum target SOC value by substituting a minimum consumption SOC value and a maximum consumption SOC value among the consumption SOCs predicted for each movement path by the consumption SOC value prediction unit 72 into Equation 7 above, respectively. In the instant case, the target SOC value when the vehicle enters the exhaust gas emission restriction zone may be defined as a range including a minimum value and a maximum value corresponding to the minimum target SOC value and the maximum target SOC. Furthermore, the target SOC value when the vehicle enters the exhaust gas emission restriction zone may be determined based on the maximum target SOC.

The SOC management unit 74 may manage the SOC value of the battery 41 before and after the vehicle enters the exhaust gas emission restriction zone.

Before the vehicle enters the exhaust gas emission restriction zone, the SOC management unit 74 may manage the SOC value of the battery 41 until the vehicle enters the exhaust gas emission restriction zone based on the target SOC value determined by the target SOC value determination unit 73. That is, the SOC management unit 74 may upwardly control the SOC value of the battery 41 so that the SOC value of the battery 41 when the vehicle enters the exhaust gas emission restriction zone is equal to or greater than the determined target SOC. For example, if it is predicted that the SOC value of the battery 41 is lower than the target SOC value (or a target SOC value lower limit) or the vehicle is lower than the target SOC value (or a target SOC value lower limit) before entering the exhaust gas emission restriction zone, the SOC management unit 74 may control the driving of the vehicle so that the power of the vehicle is supplied only by the engine 60, and the battery 31 is charged by the energy generated at the instant time. To the present end, the SOC management unit 74 may obtain information on the SOC value of the battery 41 from the battery controller 42.

After the vehicle enters the exhaust gas emission restriction zone, the SOC management unit 74 may manage the SOC value of the battery 41 based on the available SOC value of the battery 41. When the electric vehicle charging station is located within the exhaust gas emission restriction zone, the SOC management unit 74 may be obtained by subtracting the consumption SOC value consumed to move from the current position to the electric vehicle charging station from the current SOC (the residual SOC) of the battery 41 when the vehicle is driven only by the drive motor 50. If the electric vehicle charging station is not positioned within the exhaust gas emission restriction zone, the SOC management unit 74 may obtain the available SOC value of battery 41 by subtracting the consumption SOC value consumed until the vehicle is driven only by the drive motor 50 and exits the exhaust gas emission restriction zone at the current position from the current SOC (the residual SOC) of battery 41.

When the available SOC is determined, the SOC management unit 74 may display the residual SOC and the available SOC value of the battery 41 through the display device 30 to provide the information on the residual SOC and the available SOC value of the battery 41 to the driver.

The SOC management unit 74 may continuously monitor whether the available SOC value of the vehicle is lowered to a predetermined level or less while the vehicle is positioned within the exhaust gas emission restriction zone. When the available SOC is lowered to a predetermined level or less, the SOC management unit 74 may induce the movement of the vehicle so that the engine 60 of the vehicle is not turned on within the exhaust gas emission restriction zone.

For example, if the available SOC value of battery 41 is lower than the first reference SOC, the SOC management unit 74 may output guide information to the driver to induce the escape from the exhaust gas emission restriction zone of the vehicle, along with a warning signal warning that the available SOC is low, through the display device 30 or a sound output device. When inducing the escape from the exhaust gas emission restriction zone, the vehicle control device 70 may link with the navigation device 20 to guide an optimal path to get out of the exhaust gas emission restriction zone. For example, the SOC management unit 74 may control the navigation device 20 to guide the movement path including the minimum consumption SOC value among a plurality of movement paths for escaping the exhaust gas emission restriction zone. Furthermore, for example, the SOC management unit 74 may control the navigation device 20 to guide a movement path which is the shortest path among a plurality of movement paths for escaping the exhaust gas emission restriction zone.

Also, for example, if the available SOC value of the battery 41 is lower than the first reference SOC, the SOC management unit 74 may output the guide information for inducing the movement of the vehicle to the electric vehicle charging station to the driver along with a warning signal warning that the available SOC is low through the display device 30 or the sound output device.

If the available SOC value of the battery 41 is lowered and then becomes lower than 0, the SOC management unit 74 may vary the SOC (a second reference SOC), which is the standard for turning on the engine 60, to maximally suppress turning on the engine 60 within the exhaust gas emission restriction zone. When the available SOC value of the battery 41 is lower than 0, the SOC management unit 74 lowers the SOC (the second reference SOC), which is the reference for turning on the engine 60, lowering the residual SOC value of the battery 41 and then delaying the time when the engine 60 is turned on as much as possible. Equation 8 below shows an example of changing the second reference SOC (the second reference SOC), which is the reference for turning on the engine 60.

$$SOC_{REF2'} = SOC_{REF2} + SOC_A \qquad \text{[Equation 8]}$$

In Equation 8 above, $SOC_{REF2}$ represents a predetermined second reference SOC (which is the reference for turning on the engine 60) as a default, $SOC_A$ represents the available SOC (<0) of the battery 41, and $SOC_{REF2'}$ represents the second reference SOC after being available. According to Equation 8 above, the SOC management unit 74 may change the second reference SOC (the SOC which is configured as a reference for turning on the engine 60) by adding the available SOC ($SOC_A$) of the battery 41 to the second reference SOC ($SOC_{REF2}$) predetermined as the default.

The SOC management unit 74 may change the second reference SOC (the SOC which is the reference for turning on the engine 60) by subtracting the predetermined value from the second reference SOC ($SOC_{REF2}$) predetermined as a default.

The changed second reference SOC ($SOC_{REF2'}$) may be reset when the vehicle leaves the exhaust gas emission restriction zone and set back as a default value ($SOC_{REF2}$). The second reference SOC may be set lower than the above-described first reference SOC.

The vehicle control device 70 described above includes at least one electronic control apparatus (ECU: electronic control unit) (e.g., a Hybrid Control Unit (HCU) mounted in the vehicle, and the functions of the aforementioned driving energy prediction unit 71, consumption SOC value prediction unit 72, target SOC value determination unit 73, and SOC management unit 74 may be performed by such at least one electronic control apparatus.

Figure 2A:
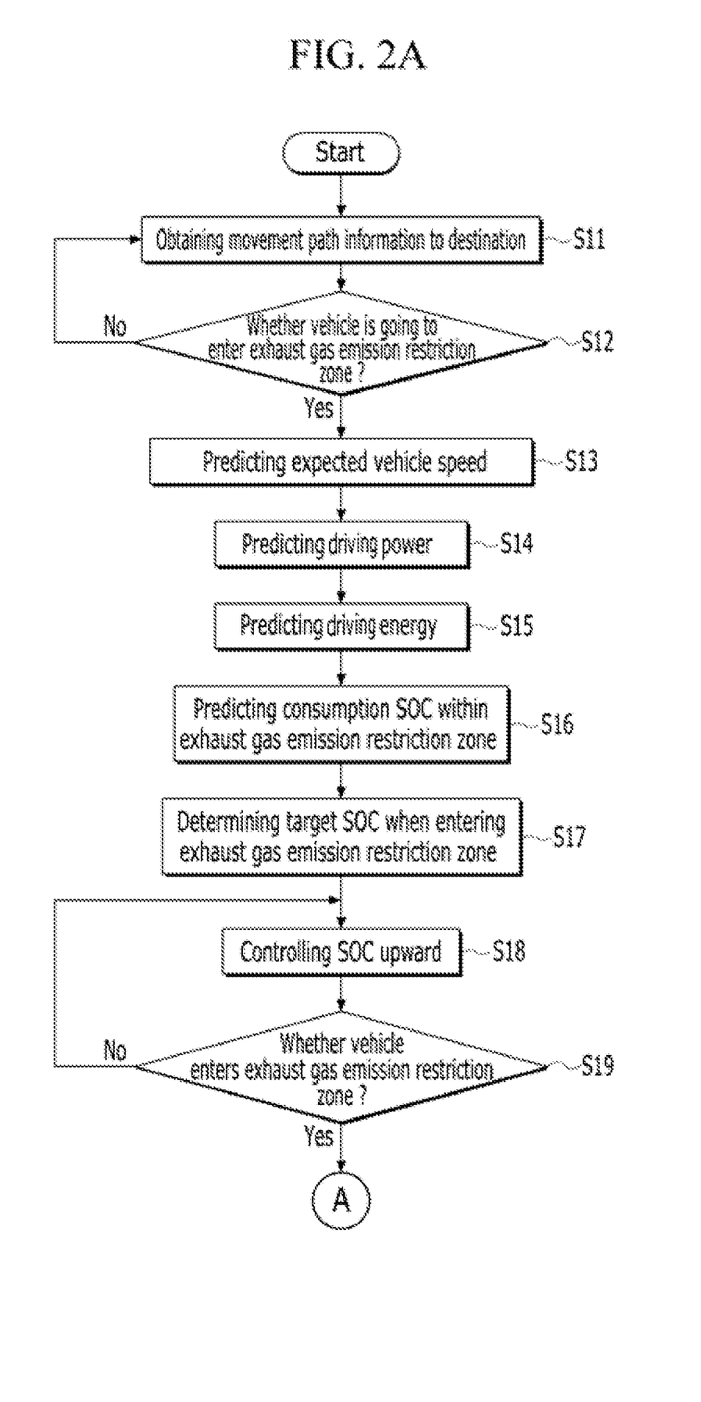
FIG. 2A and FIG. 2B are views schematically showing a method of controlling driving of a vehicle according to an exemplary embodiment of the present disclosure.
Figure 2B:
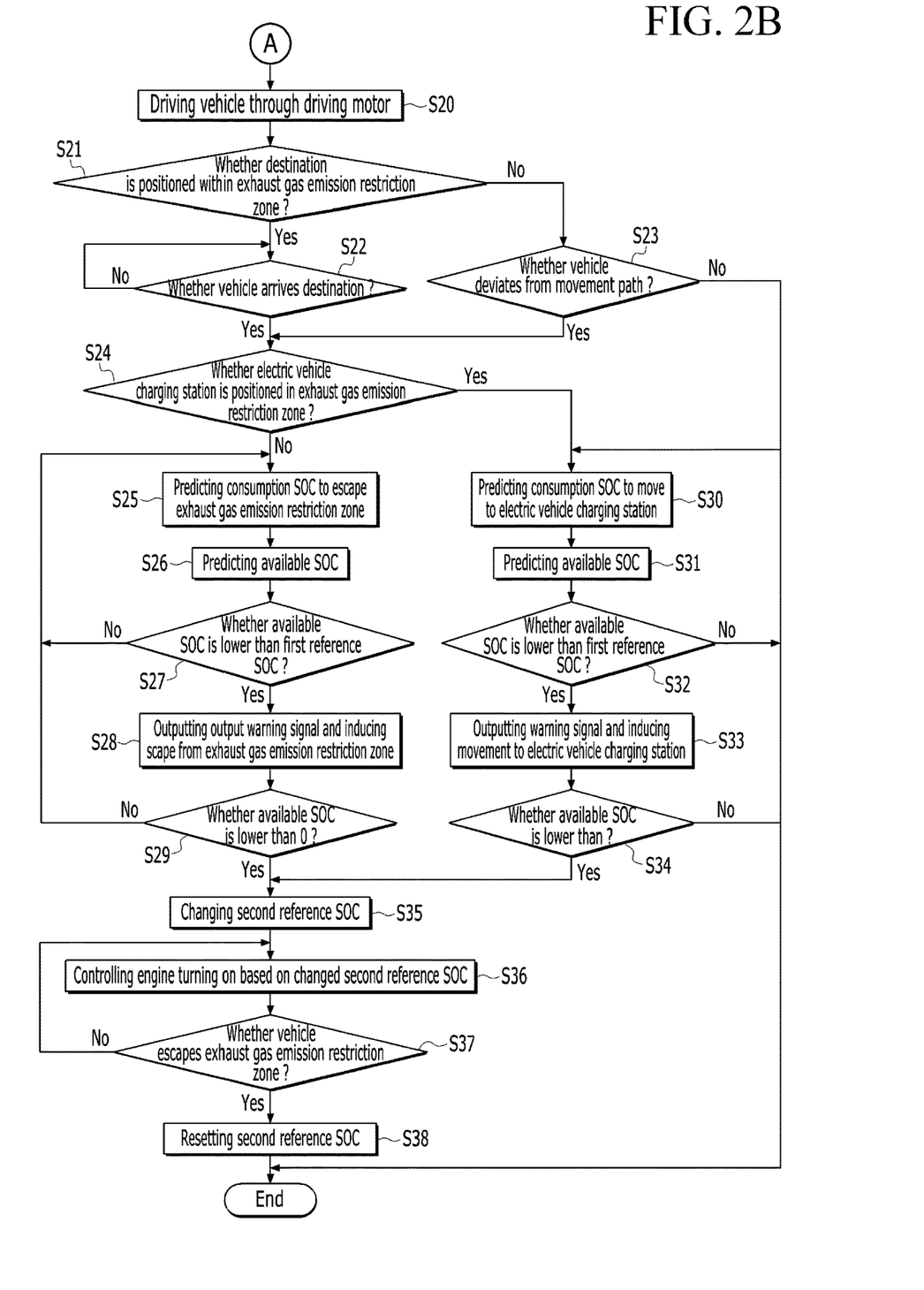

FIG. 2A and FIG. 2B are views schematically showing a method of controlling driving of a vehicle according to an exemplary embodiment of the present disclosure. FIG. 2A shows the driving control method until the vehicle enters the exhaust gas emission restriction zone, and FIG. 2B shows the driving control method after the vehicle enters the exhaust gas emission restriction zone. The driving control method of FIG. 2A and FIG. 2B may be performed by the vehicle control device 70 of the vehicle system 1 described above with reference to FIG. 1.

Referring to FIG. 2A, when the vehicle's destination is set by the driver, the vehicle control device 70 may obtain the movement path information to the destination of the vehicle through the navigation device 20 (S11) and check whether the vehicle is going to enter the exhaust gas emission restriction zone based on this (S12).

FIG. 2A shows a case in which the vehicle control device 70 receives the movement path information of the vehicle searched from the navigation device 20 and confirms whether the vehicle is scheduled to enter the exhaust gas emission restriction zone based on this, but embodiments of the present disclosure are not limited thereto. According to another exemplary embodiment of the present disclosure, the vehicle control device 70 may be notified from the navigation device 20 that the vehicle is scheduled to enter the exhaust gas emission restriction zone. In the instant case, if the searched movement path to the destination of the vehicle includes a road area belonging to the exhaust gas emission restriction zone, the navigation device 20 may notify the vehicle control device 70 that the vehicle is going to enter the exhaust gas emission restriction zone.

If the vehicle is going to enter the exhaust gas emission restriction zone, the vehicle control device 70 may predict the expected vehicle speed in each road area where the vehicle is expected to move based on the driving pattern of the driver (S13).

In the step S13, the vehicle control device 70 may analyze the driver's driving pattern based on the driving state information of the vehicle received from the driving state detection device 10 while the vehicle is driving. The driving pattern of the driver may be obtained by comparing the road average vehicle speed of the road sections in which the vehicle has passed for a predetermined time period with the vehicle speed of the vehicle while passing the corresponding section. For example, the vehicle control device 70 may obtain the speed difference value between the average vehicle speed of at least one road section that the vehicle has passed for a predetermined time period and the average vehicle speed of the vehicle while passing the corresponding road section as the driving pattern of the driver. Also, for example, the vehicle control device 70 may obtain a speed ratio of the average vehicle speed of the vehicle while passing the corresponding road section for the road average vehicle speed of at least one road section that the vehicle has passed for a predetermined time period as the driving pattern of the driver.

Also, in the step S13, the vehicle control device 70 may identify the road sections in which the vehicle is expected to travel based on the movement path information of the vehicle received from the navigation device 20. The vehicle control device 70 may also determine the road average vehicle speed of each identified road section and the expected vehicle speed of the vehicle for each identified road section based on the driving pattern of the driver. For example, the vehicle control device 70 may determine the speed difference value by subtracting the road average vehicle speed of the road section that the vehicle has passed for a predetermined time period from the average vehicle speed of the vehicle in the corresponding road section, and may determine by adding this to the road average vehicle speed of the road section where the vehicle is expected to drive (referring to Equation 1 above). Furthermore, for example, the vehicle control device 70 may determine the speed ratio of the average vehicle speed of the vehicle in the corresponding road section for the road average vehicle speed of the road section that the vehicle has passed for a predetermined time period, and may determine the expected vehicle speed of the vehicle by multiplying this by the road average vehicle speed of the road section where the vehicle is expected to travel (referring to Equation 2 above).

When the expected vehicle speed in each road section where the vehicle is expected to travel is obtained through the step S13, the vehicle control device 70 may predict the driving power of the vehicle required to drive each road section using this (S14).

In the step S14, the driving power may be predicted based on the expected vehicle speed of the vehicle in each road section, gradient information of each road section, the specification information of the vehicle, and the like. That is, the vehicle control device 70 acquires the air resistance force, rolling resistance force and climbing force of the vehicle, respectively, based on the expected vehicle speed of the vehicle, the gradient information of each road section, the vehicle specification information, etc., and sums them up to obtain the driving power of the vehicle (referring to Equation 3 above).

When the driving power of the vehicle in each road section where the vehicle is expected to travel is predicted through the step S14, the vehicle control device 70 may predict the driving energy consumed by the vehicle to move through the corresponding section for each section by use of this (S15).

In the step S15, the vehicle control device 70 may predict the expected driving time of the vehicle for each road section based on the expected vehicle speed of the vehicle predicted through the step S13. Accordingly, the vehicle control device 70 may determine the driving energy for the corresponding section by accumulating the driving power during the expected driving time for the section for which the driving energy of the vehicle is to be predicted.

In the step S15, when the movement path of the vehicle is predetermined to pass through the exhaust gas emission restriction zone, the vehicle control device 70 may predict the driving energy consumed while the vehicle passes through the exhaust gas emission restriction zone. When the destination of the vehicle is positioned within the exhaust gas emission restriction zone, the vehicle control device 70 may predict the driving energy until the vehicle enters the exhaust gas emission restriction zone and moves to the destination. When the destination of the vehicle is positioned within the exhaust gas emission restriction zone and the electric vehicle charging station is positioned within the exhaust gas emission restriction zone, the vehicle control device 70 may predict the driving energy consumed to move from the destination of the vehicle to the electric vehicle charging station. If the destination of the vehicle is located within the exhaust gas emission restriction zone and there is no electric vehicle charging station within the exhaust gas emission restriction zone, the vehicle control device 70 may predict the driving energy consumed to move from the destination of the vehicle to get out of the exhaust gas emission restriction zone.

When the driving energy is predicted through the step S15, the vehicle control device 70 may predict the consumption SOC value of the battery 41 consumed when the vehicle is driven only by the drive motor 50 within the exhaust gas emission restriction zone by use of this (S16).

In the step S16, the vehicle control device 70 may determine the consumption SOC value by dividing the predicted driving energy of the battery 41 by the energy when the battery 41 is fully charged (referring to Equation 4 above).

In the step S16, when the movement path of the vehicle passes through the exhaust gas emission restriction zone, the vehicle control device 70 may predict the consumption SOC value consumed by the vehicle to pass through the exhaust gas emission restriction zone. When the movement path of the vehicle is positioned within the exhaust gas emission restriction zone, the vehicle control device 70 may also predict the consumption SOC value consumed by the vehicle to move to the destination by entering the exhaust gas emission restriction zone. When the destination of the vehicle is positioned within the exhaust gas emission restriction zone and the electric vehicle charging station is positioned within the exhaust gas emission restriction zone, the vehicle control device 70 may also predict the consumption SOC value consumed to travel from the destination of the vehicle to the electric vehicle charging station. If the destination of the vehicle is located within the exhaust gas emission restriction zone and there is no electric vehicle charging station within the exhaust gas emission restriction zone, the vehicle control device 70 may predict the consumption SOC value consumed in moving out of the exhaust gas emission restriction zone at the destination of the vehicle.

When the vehicle control device 70 determines the consumption SOC value of the vehicle in the exhaust gas emission restriction zone through the step S16, the vehicle control device 70 may determine the target SOC value of the vehicle when entering the exhaust gas emission restriction zone by use of this (S17).

In the step S17, when the movement path of the vehicle passes through the exhaust gas emission restriction zone, the vehicle control device 70 may determine the target SOC value based on the consumption SOC value while the vehicle passes the exhaust gas emission restriction zone (see Equation 5 above). When the destination of the vehicle is located within the exhaust gas emission restriction zone and the electric vehicle charging station is located within the emission restriction zone, the vehicle control device 70 may also determine the target SOC value based on the sum of the consumption SOC value consumed by the vehicle to move to the destination after entering the exhaust gas emission restriction zone and the consumption SOC value consumed by the vehicle to move from the destination to the electric vehicle charging station (see Equation 6 above). If the destination of the vehicle is located within the exhaust gas emission restriction zone and there is no electric vehicle charging station within the exhaust gas emission restriction zone, the vehicle control device 70 may determine the target SOC value based on the sum of the consumption SOC value consumed by the vehicle to move to the destination after entering the exhaust gas emission restriction zone and the consumption SOC value consumed by the vehicle to move out of the exhaust gas emission restriction zone at the destination (referring to Equation 7 above).

When the target SOC value of the vehicle when entering the exhaust gas emission restriction zone is determined through the step S17, the vehicle control device 70 may perform an SOC upward control until the vehicle enters the exhaust gas emission restriction zone (S18 and S19).

In the step S18, if the SOC value of the battery 41 is lower than the target SOC value or is predicted to be lower than the target SOC value before the vehicle enters the exhaust gas emission restriction zone, the vehicle control device 70 may control the vehicle to be driven by the engine 60 to increase the SOC value of the battery 41.

Referring to FIG. 2B, when the vehicle enters the exhaust gas emission restriction zone, the vehicle control device 70 may control the vehicle to be driven only by the drive motor 50 (S20).

After that, if the destination of the vehicle is positioned within the exhaust gas emission restriction zone (S21) and the vehicle arrives at the destination within the exhaust gas emission restriction zone (S22), the vehicle control device 70 may identify the state that the vehicle stays in the exhaust gas emission restriction zone. Furthermore, even if the destination of the vehicle is not within the exhaust gas emission restriction zone (when passing through the exhaust gas emission restriction zone) (S21), when the vehicle deviates from the movement path searched by the navigation device 20 within the exhaust gas emission restriction zone (S23), the vehicle control device 70 may identify the vehicle as staying in the exhaust gas emission restriction zone. If the vehicle is identified as staying within the exhaust gas emission restriction zone, the vehicle control device 70 may perform operations for suppressing turning on the engine 60 of the vehicle within the exhaust gas emission restriction zone (referring to steps S24 to S36 to be described later).

If there is no electric vehicle charging station in the exhaust gas emission restriction zone (S24), the vehicle control device 70 may search for the movement path for the vehicle to escape the exhaust gas emission restriction zone from the current position through the navigation device 20. Accordingly, the vehicle control device 70 may predict the consumption SOC value of the battery 41 when the searched movement path is driven only by the drive motor 50 (S25).

In the step S25, when there are multiple movement paths that the vehicle can select to get out of the exhaust gas emission restriction zone, the vehicle control device 70 may predict the consumption SOC value for each path.

When the consumption SOC value for the vehicle to escape the exhaust gas emission restriction zone is predicted, the vehicle control device 70 may predict the available SOC value of the battery 41 based on this (S26).

In the step S26, the available SOC value of the battery 41 may be obtained by subtracting the consumption SOC value predicted through the step S25 from the current SOC (the residual SOC) of the battery 41. When the available SOC is determined, the residual SOC and the available SOC value of the battery 41 may be displayed through the display device 30 to provide the information on the residual SOC and the available SOC value of the battery 41 to the driver.

While the vehicle is positioned within the exhaust gas emission restriction zone, the vehicle control device 70 may continuously monitor whether the available SOC value of the battery 41 is lowered to a predetermined level or less. When the available SOC value of the battery 41 is lower than the first reference SOC (S27), the vehicle control device 70 may output a warning signal warning that the available SOC is low through the display device 30 or the sound output device and may output the guidance information that induces the escape from the exhaust gas emission restriction zone of the vehicle to the driver (S28).

In the step S28, when outputting the guidance information, the vehicle control device 70 may provide the information on the movement path for escaping the exhaust gas emission restriction zone through the navigation device 20 together. When there are multiple movement paths that the vehicle can select to get out of the exhaust gas emission restriction zone, the vehicle control device 70 may select the information on an optimal movement path such as the shortest path and the minimum consumption SOC value path among these paths to be guided through the navigation device 20.

When the available SOC value of the battery 41 is decreased and then becomes lower than 0 (S29), the vehicle control device 70 may change the SOC which is the reference for turning on the engine 60, that is, the second reference SOC (S35). Accordingly, the vehicle control device 70 may control the time when the engine 60 is turned on based on the second reference SOC changed until the vehicle escapes the exhaust gas emission restriction zone (S36 and S37). Thereafter, when the vehicle leaves the exhaust gas emission restriction zone, the vehicle control device 70 resets the second reference SOC changed through the step S35 so that it is reset as a default value (S38).

In the step S24, when the electric vehicle charging station is positioned within the exhaust gas emission restriction zone, the vehicle control device 70 may search for the movement path for the vehicle to move from the current position to the electric vehicle charging station through the navigation device 20. Accordingly, the vehicle control device 70 may predict the consumption SOC value of the battery 41 when the searched movement path is driven only by the drive motor 50 (S30).

When the consumption SOC value for moving the vehicle from the current position to the electric vehicle charging station is predicted, the vehicle control device 70 may predict the available SOC value of the battery 41 based on this (S31).

In the step S31, the vehicle control device 70 may obtain the available SOC by subtracting the consumption SOC value predicted in the step S30 from the current SOC (the residual SOC) of the battery 41. When the available SOC is determined, the residual SOC and the available SOC value of the battery 41 may be displayed through the display device 30 to provide the driver with the information on the residual SOC and the available SOC value of the battery 41.

The vehicle control device 70 may continuously monitor whether the available SOC value of the battery 41 is lowered to a predetermined level or less while the vehicle is positioned within the exhaust gas emission restriction zone. When the available SOC value of battery 41 is lower than the first reference SOC (S32), the vehicle control device 70 may output the warning signal warning that the available SOC is low through the display device 30 or the sound output device and output the information for inducing the movement to the electric vehicle charging station to the driver (S33).

In the step S33, when the guidance information is output, the vehicle control device 70 may provide the information on the movement path for the vehicle to move to the electric vehicle charging station through the navigation device 20 together.

When the available SOC value of the battery 41 decreases and is lower than 0 (S34), the vehicle control device 70 may change the SOC which is the reference for turning on the engine 60, that is, the second reference SOC (S35). Accordingly, the vehicle control device 70 may control the time when the engine 60 is turned on based on the second reference SOC changed until the vehicle escapes the exhaust gas emission restriction zone (S36 and S37). Thereafter, when the vehicle leaves the exhaust gas emission restriction zone, the vehicle control device 70 resets the second reference SOC changed through the step S35 to be reset to the default value (S38).

On the other hand, if the destination of the vehicle is not positioned within the exhaust gas emission restriction zone and the vehicle is moving along the movement path searched by the navigation device 20 (S23), before entering the exhaust gas emission restriction zone, since the sufficient SOC has been secured through the SOC upward control (referring to the step S18 of FIG. 2A), the vehicle control device 70 may not additionally perform the operations for suppressing turning on the engine 60 of the vehicle within the exhaust gas emission restriction zone.

According to the above, the vehicle system 10 according to the exemplary embodiment of the present disclosure, if the vehicle is predicted to enter the exhaust gas emission restriction zone, predicts in advance the driving energy consumed by the vehicle within the exhaust gas emission restriction zone and the consumption SOC value of the battery 41 according thereto, and manages the SOC value of the battery 41 based on this. That is, the vehicle system 10 controls the operation of the vehicle so that the battery 41 is sufficiently charged before the vehicle enters the exhaust gas emission restriction zone based on the SOC predicted to be consumed by the battery 41 in the exhaust gas emission restriction zone. Furthermore, the vehicle system 10 continuously monitors the available SOC value of the battery 41 after the vehicle enters the exhaust gas emission restriction zone, when the available SOC is improved, it is possible to suppress the operation of the engine 60 of the vehicle within the exhaust gas emission restriction zone by inducing the vehicle to leave the exhaust gas emission restriction zone or move to the electric vehicle charging station.

The driving method of controlling the vehicle according to the above-described embodiment may be executed through software. When being implemented through software, the components of the present disclosure are code segments that perform necessary tasks. The program or code segments may be stored on a processor readable medium or transmitted by a computer data signal coupled with a carrier wave in a transmission medium or communication network.

The computer-readable recording medium includes all kinds of recording devices in which data that can be read by the computer system is stored. Examples of the computer-readable recording medium include a ROM, a RAM, a CD-ROM, a DVD_ROM, a DVD_RAM, a magnetic tape, a floppy disk, a hard disk, and an optical data storage device. Furthermore, the computer-readable recording medium is distributed to the computer devices connected to the network so that the computer-readable code may be stored and executed by a distributed method.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle system comprising:
a navigation device configured to search a movement path to a destination of a vehicle; and
a control device configured to:
predict driving energy of a road section included in the movement path according to a vehicle speed of the vehicle when the movement path includes an exhaust gas emission restriction zone;
predict a first consumption State of charge (SOC) value of a battery consumed within the exhaust gas emission restriction zone based on the driving energy for a case in which the vehicle drives in the exhaust gas emission restriction zone without driving an engine of the vehicle;
determine a target SOC value of the battery when the vehicle enters the exhaust gas emission restriction zone based on the predicted first consumption SOC; and
control operation of the vehicle so that a residual SOC value of the battery is greater than or equal to the target SOC value when the vehicle enters the exhaust gas emission restriction zone,
wherein the control device is further configured to:
predict an expected vehicle speed of the vehicle for the road section included in the exhaust gas emission restriction zone based on the vehicle speed of the vehicle during a predetermined time period, a first road average vehicle speed in a road section that the vehicle has passed during the predetermined time period and a second road average vehicle speed in the road section included in the exhaust gas emission restriction zone; and
predict the driving energy for the road section included in the exhaust gas emission restriction zone based on the expected vehicle speed, and
wherein the control device is further configured to:
obtain a difference between the vehicle speed in the road section over which the vehicle has passed and the first road average vehicle speed, or a ratio of the vehicle speed to the first road average vehicle speed in the road section over which the vehicle has passed; and
determine the expected vehicle speed by adjusting the second road average vehicle speed in the road section included in the exhaust gas emission restriction zone based on the obtained difference or the obtained ratio.

2. The vehicle system of claim 1, wherein the control device is configured to predict the driving energy based on the expected vehicle speed in the corresponding road section, and an air resistance force of the vehicle corresponding to a front projection area of the vehicle, an inclination angle of the corresponding road section, and a rolling resistance force and climbing force of the vehicle corresponding to a weight of the vehicle.

3. The vehicle system of claim 1, wherein the control device is configured to predict an SOC value consumed by the vehicle to pass the exhaust gas emission restriction zone as the first consumption SOC value when the movement path passes through the exhaust gas emission restriction zone.

4. The vehicle system of claim 1, wherein the control device, when the destination is positioned within the exhaust gas emission restriction zone, is configured to determine the first consumption SOC value by use of a second consumption SOC value consumed by the vehicle to the destination by entering the exhaust gas emission restriction zone, and a third consumption SOC value consumed by the vehicle moving from the destination to an electric vehicle charging station within the exhaust gas emission restriction zone or from the destination to leaving the exhaust gas emission restriction zone.

5. The vehicle system of claim 1, wherein the control device is configured to:
after the vehicle enters the exhaust gas emission restriction zone, determine an available SOC value of the battery based on a fourth consumption SOC value consumed by the vehicle moving from a current position thereof to an electric vehicle charging station positioned within the exhaust gas emission restriction zone or moving from the current position to leaving the exhaust gas emission restriction zone, and the residual SOC value of the battery; and
induce movement of the vehicle so that the engine is not driven within the exhaust gas emission restriction zone when the available SOC is lowered below a predetermined level.

6. The vehicle system of claim 5, further including a display device, wherein the control device is configured to display the available SOC through the display device,
wherein the control device is configured to output a warning signal through the display device when the available SOC is lower than a first reference SOC, and
wherein the control device is configured to, when the available SOC is lower than the first reference SOC, provide a movement path for the vehicle to move from the current position to the electric vehicle charging station positioned within the exhaust gas emission restriction zone through the navigation device or to exit the exhaust gas emission restriction zone from the current position.

7. The vehicle system of claim 5, wherein the control device is configured to, when the available SOC is lower than a predetermined value, change a second reference SOC, which is a reference for turning on the engine to prevent an overdischarge of the battery.

8. The vehicle system of claim 1, wherein the exhaust gas emission restriction zone is a zero emission zone (ZEZ).

9. A method of controlling driving of a vehicle, the method comprising:
predicting, by a control device, a driving energy of a road section included in a movement path according to a vehicle speed of the vehicle when a movement path to a destination of the vehicle searched by a navigation device includes an exhaust gas emission restriction zone;
predicting, by the control device, a first consumption State of charge (SOC) value of a battery consumed within the exhaust gas emission restriction zone based on the predicted driving energy for a case in which the vehicle drives in the exhaust gas emission restriction zone without driving an engine of the vehicle;

determining, by the control device, a target SOC value of the battery at a time the vehicle enters the exhaust gas emission restriction zone based on the predicted first consumption SOC; and controlling, by the control device, an operation of the vehicle so that a residual SOC value of the battery is greater than or equal to the target SOC value when the vehicle enters the exhaust gas emission restriction zone, wherein the predicting of the driving energy includes:
predicting an expected vehicle speed of the vehicle for the road section included within the exhaust gas emission restriction zone based on the vehicle speed of the vehicle during a predetermined time period, a first road average vehicle speed in a road section that the vehicle has passed during the predetermined time period, and a second road average vehicle speed in the road section included in the exhaust gas emission restriction zone; and predicting the driving energy for the road section included in the exhaust gas emission restriction zone based on the expected vehicle speed, and wherein the predicting of the expected vehicle speed includes:
obtaining a difference between the vehicle speed in the road section over which the vehicle has passed and the first road average vehicle speed, or a ratio of the vehicle speed to the first road average vehicle speed in the road section over which the vehicle has passed; and determining the expected vehicle speed by adjusting the second road average vehicle speed in the road section included in the exhaust gas emission restriction zone based on the obtained difference or the obtained ratio.

10. The method of claim 9, wherein the predicting of the driving energy based on the vehicle speed includes predicting the driving energy based on the expected vehicle speed in the corresponding road section, and an air resistance force of the vehicle corresponding to a front projection area of the vehicle, an inclination angle of the corresponding road section, and a rolling resistance force and climbing force of the vehicle corresponding to a weight of the vehicle.

11. The method of claim 9, wherein the predicting of the first consumption SOC value includes predicting an SOC value consumed by the vehicle to pass the exhaust gas emission restriction zone as the first consumption SOC value when the movement path passes through the exhaust gas emission restriction zone.

12. The method of claim 9, wherein the predicting of the first consumption SOC value includes determining the first consumption SOC value by use of a second consumption SOC value consumed by the vehicle to the destination by entering the exhaust gas emission restriction zone, and a third consumption SOC value consumed by the vehicle moving from the destination to an electric vehicle charging station within the exhaust gas emission restriction zone or from the destination to leaving the exhaust gas emission restriction zone when the destination is positioned within the exhaust gas emission restriction zone.

13. The method of claim 9, further including:
determining, by the control device, an available SOC value of the battery based on a fourth consumption SOC value consumed by the vehicle moving from a current position thereof to an electric vehicle charging station positioned within the exhaust gas emission restriction zone or moving from the current position to leaving the exhaust gas emission restriction zone, and the residual SOC value of the battery after the vehicle enters the exhaust gas emission restriction zone; and inducing, by the control device, the movement of the vehicle so that the engine is not driven within the exhaust gas emission restriction zone when the available SOC is lowered below a predetermined level.

14. The method of claim 13, further including:
displaying, by the control device, the available SOC through a display device,
wherein the inducing includes outputting, by the control device, a warning signal through the display device when the available SOC is lower than a first reference SOC, and
wherein the inducing further includes providing a movement path for the vehicle to move from the current position to the electric vehicle charging station positioned within the exhaust gas emission restriction zone through the navigation device or to exit the exhaust gas emission restriction zone from the current position when the available SOC is lower than the first reference SOC.

15. The method of claim 13, further including:
changing, by the control device, a second reference SOC, which is a reference for turning on the engine to prevent an overdischarge of the battery when the available SOC is lower than a predetermined value.

16. The method of claim 9, wherein the exhaust gas emission restriction zone is a zero emission zone (ZEZ).

* * * * *